United States Patent Office 3,305,172
Patented Feb. 21, 1967

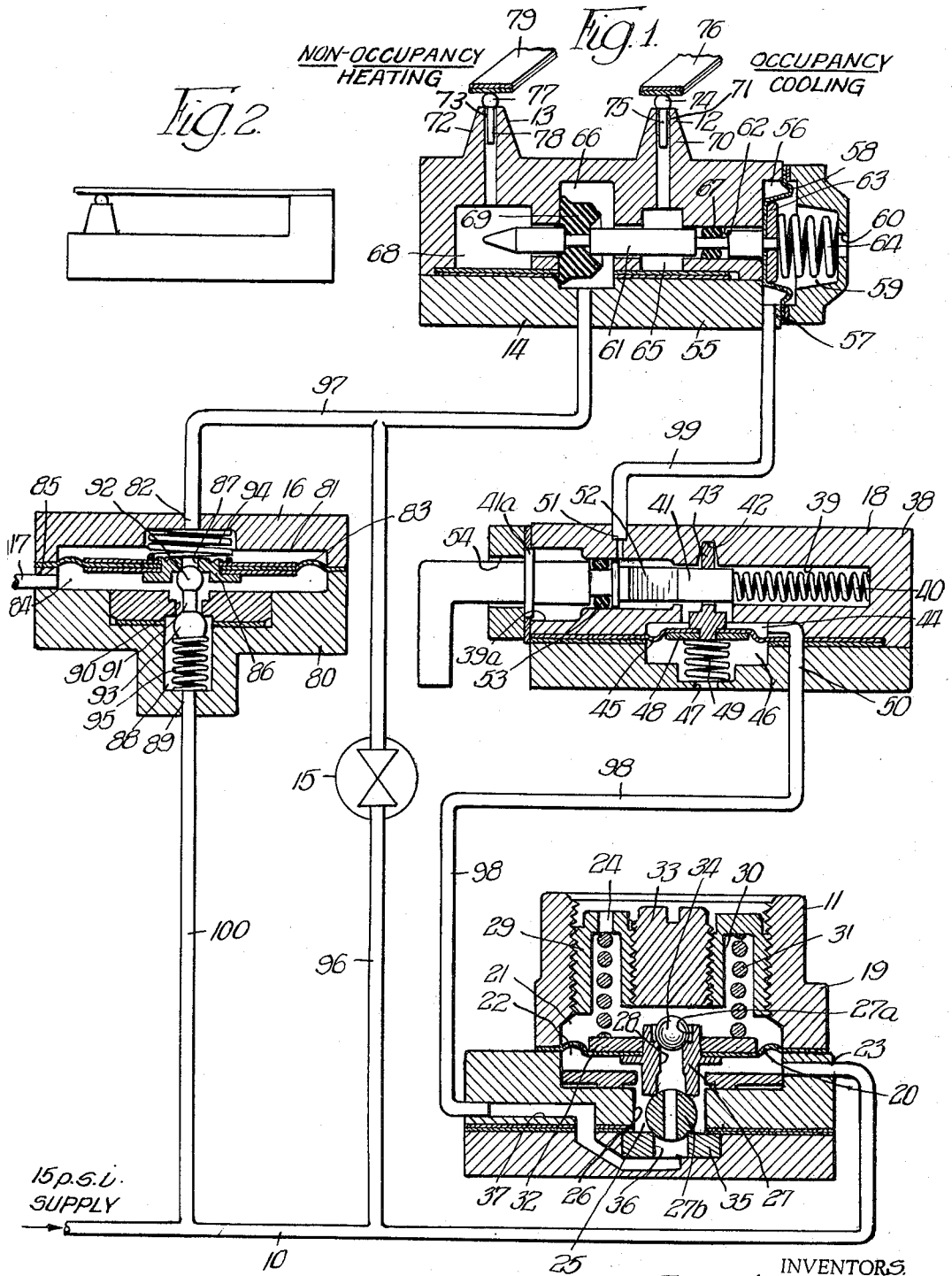

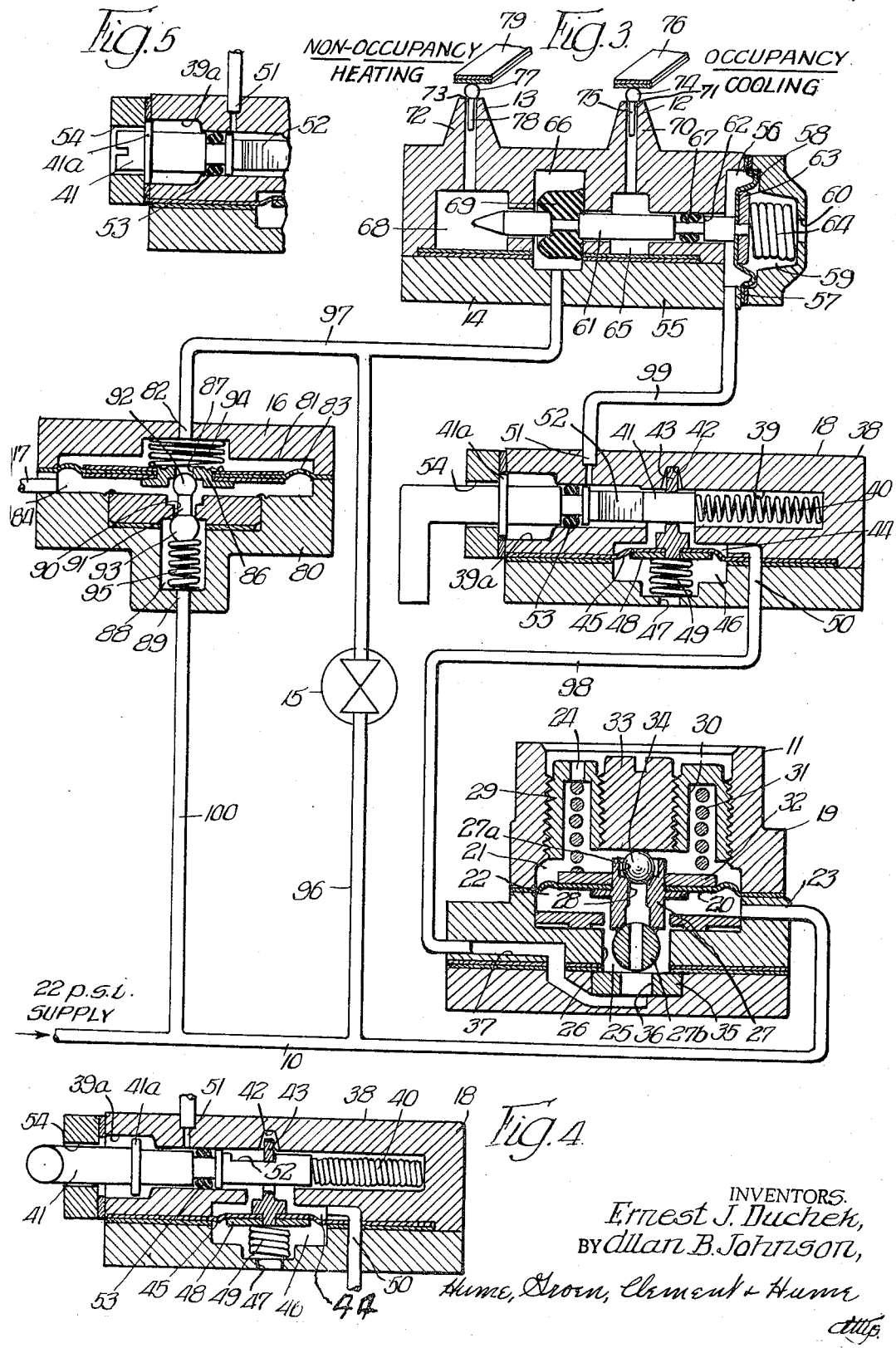

3,305,172
TEMPERATURE CONTROL DEVICE
Ernest J. Duchek, Prospect Heights, and Allan B. Johnson, Mount Prospect, Ill., assignors to The Powers Regulator Company, Skokie, Ill., a corporation of Illinois
Filed Sept. 4, 1964, Ser. No. 394,435
10 Claims. (Cl. 236—1)

This invention relates to temperature control systems and in particular to a two-mode thermostat for use in pneumatic temperature control systems. As used herein, "mode" refers to a particular state or condition of temperature control, for example, heating control to maintain an ambient temperature of 72°, cooling control to maintain an ambient temperature of 72°, or heating control to maintain a non-occupancy ambient temperature of 60°.

In many temperature control applications, it is desirable to provide alternative modes or conditions of temperature control and means for selecting one control mode or the other. Of particular interest herein are installations in large buildings, such as schools, hospitals, and office buildings, in which respective rooms or distinct building areas are provided with individual thermostat units. To achieve two-mode temperature control in such cases without the expense, inefficiency, and complexity of providing separate controls for each control mode, the individual thermostat units must be provided with means for locally accomplishing two-mode thermostatic control and with means for switching from one temperature control mode to the other in response to a signal from a central control station. In the past, a single temperature responsive valve has generally been used to effect temperature control during both temperature control modes. However, this approach requires some form of leverage system to enable the single valve to change over from one control mode to the other. Such leverage systems introduce problems of size, laggard response, and hysteresis, particularly where the alternative control modes are heating and cooling and both direct acting and reverse acting responses are required. Accordingly, it is a primary object of the present invention to provide a pneumatic, two-mode thermostat which provides distinct temperature responsive means for each control mode and which switches from one temperature control mode to the other in response to a signal from a central control station by activating the corresponding temperature responsive means and deactivating the other temperature responsive means.

Also of particular interest herein is the type of two-mode temperature control system especially useful in schools and office buildings in which one control mode is provided to maintain a specific temperature level such as 72° during periods of occupancy and a second control mode is provided to maintain a temperature level such as 60° during periods of normal nonoccupancy such as nights, weekends and holidays. In this type of installation, it is also advantageous to provide the individual room thermostat units with means to locally override the change-over signal from the central control stations. For example, in an office building in which the room thermostats have been set by a central control station signal for nonoccupancy temperature control, override means provided in individual thermostats would enable personnel working at night or other times of normal nonoccupancy to continue the occupancy temperature level of 72° in particular rooms or building areas. Hence, it is another primary object of the present invention to provide a two-mode thermostat which is adapted to enable local override of the switching signal from the central control station. It is a further object of the present invention to provide, in a two-mode thermostat, local override means which are adapted to be returned automatically to nonoverride condition when the central control station switches the overall system to the temperature control mode being maintained locally by the override means.

Additionally, it is significant that previous two-mode thermostats have been characterized by lack of versatility. Specifically, previous two-mode thermostats have been designed to provide only one of the two basic types of two-mode control, i.e., only heating and cooling two-mode control or only occupancy and non-occupancy two-mode control. As a result, previous heating and cooling type thermostats generally cannot be readily modified to provide occupancy-nonoccupancy control; nor can the previous occupancy-nonoccupancy thermostats be readily modified to provide heating-cooling control. Accordingly, it is a further object of the present invention to provide a two-mode pneumatic thermostat which is adapted to effect either heating-cooling type control or occupancy-nonoccupancy control with only slight modification. It will be recognized that the attainment of this object results in a cost-saving both in manufacture of the thermostat and in maintenance and repair of the thermostat since the structure remains basically the same, regardless of whether the thermostat is utilized for heating-cooling type control or occupancy–nonoccupancy type control.

Briefly, the two-mode thermostat of this invention comprises a source for supplying pneumatic fluid at a first predetermined pressure to establish a first temperature control mode and at a second predetermined pressure to establish a second temperature control mode, means for communicating control pressure signals from the thermostat, first temperature responsive means adapted when activated to initiate a control pressure signal which is a function of ambient temperature and indicative of the first temperature control mode, second temperature responsive means adapted when activated to initiate a control pressure signal which is a function of ambient temperature and indicative of the second temperature control mode, pressure responsive switching means connected to the supply pressure source, the switching means being responsive to the presence of the first predetermined pressure to provide a first switching signal and responsive to the presence of the second predetermined pressure to provide a second switching signal, and change-over means responsive to the first switching signal to selectively activate the first temperature responsive means and responsive to the second switching signal to selectively activate the second temperature responsive means. In addition, override means are connected between the switching means and the change-over means. The override means are adapted to be manually actuated to block communication of the second switching signal to the change-over means so as to set the change-over means in the condition activating the first temperature responsive means.

These and other features and objects of the invention will be apparent upon reading of the particular description with reference to the following drawings.

In the drawings:

FIGURE 1 is a diagrammatic view, partly in section, of the thermostat at one temperature control mode setting.

FIGURE 2 is a side view in elevation illustrating a possible exterior profile of a compact thermostat assembly.

FIGURE 3 is a diagrammatic view, again partly in section, of the thermostat at the other temperature control mode setting.

FIGURE 4 is a cross-sectional view of the override selector in actuated position.

FIGURE 5 shows the outer end of the selector rod as modified in a heating-cooling thermostat.

Referring now to FIGURES 1 and 3 there is shown a preferred embodiment of the room thermostat or temperature control unit of a two-mode temperature control system. As will be apparent further on, the embodiment shown is equally valuable for use in a heating-cooling type temperature control system or an occupancy-non-occupancy type temperature control system. As an aid to understanding the invention, the structure and operation of this embodiment will first be characterized in general terms.

A supply pressure conduit 10 supplies the individual room thermostats from a common pressure source (not shown) of conventional design. The common pressure source is adapted to selectively provide two levels of supply pressure, for example, 15 p.s.i. and 22 p.s.i., which correspond to the respective temperature control modes. The thermostat includes a switching valve 11 connected to the supply line 10, a pair of temperature responsive bleed valves 12 and 13 to provide, respectively, first and second modes of temperature control, and a change-over valve 14 connected to the supply line 10 through a restriction 15. The change-over valve 14 serves to connect one or the other of the pair of bleed valves 12 and 13 to the supply line 10 through the restriction 15, thereby accomplishing the selection of the first or second temperature control mode. Control pressure signals generated by the activated bleed valve are amplified in a relay 16 and transmitted via branch line 17 to a motor valve (not shown) to provide the desired temperature control.

When the pressure level in the supply line 10 is set at 15 p.s.i., the switching valve 11 serves to vent the motor portion of the change-over valve 14, and the change-over valve 14 assumes a position activating the first control mode bleed valve 12. However, when the supply line pressure is raised to 22 p.s.i. the switching valve 11 communicates supply pressure to the motor portion of the change-over valve 14 which, in turn, deactivates the first control mode bleed valve 12 and activates the second control mode bleed valve 13. A manually actuated override selector 18 is interconnected between the switching valve 11 and the change-over valve 14. When actuated, the override selector 18 serves to prevent communication of supply pressure to the motor portion of the change-over valve 14, thereby enabling local operation at the first temperature control mode despite a 22 p.s.i. pressure level in the supply line 10. If the override selector 18 is in actuated condition when the supply pressure in line 10 is returned to 15 p.s.i., the override selector automatically resets itself to normal, non-actuated condition.

Considering now in greater detail the structure of constituent parts of the embodiment shown in FIGURES 1 and 3, it should be noted first that the switching valve 11, the override selector 18, the change-over valve 14, and the relay 16 are shown separately and in section as part of the diagrammatic views of FIGURES 1 and 3. In practice, it is contemplated that these parts of the embodiment will be integral portions of a compact thermostat assembly with a profile, for example, like that shown in FIGURE 2. Accordingly, it should be understood that the various sections of the casings of these parts will be affixed together by screws or other conventional means (not shown) located at appropriate points in the thermostat assembly.

The switching valve

The pressure responsive switching valve 11 comprises a casing 19 in which the diaphragm 20 separates an exhaust chamber 21 from an inlet pressure chamber 22 having an inlet port 23 connected to the supply line 10. The exhaust chamber 21 communicates with the atmosphere by means of an exhaust port 24. The inlet pressure chamber 22 is adapted to communicate with an outlet chamber 25 by means of a bore 26. A valve member 27 is centrally mounted in the diaphragm 20 and partially received in the bore 26. At its upper end, the valve member 27 is provided with a valve seat 27a in which a free floating ball valve 34 is disposed. At its lower end, the valve member 27 is provided with a spherical end portion 27b which is welded or otherwise rigidly affixed to the valve member 27. An axial bore 28 extends from the valve seat 27a through the valve member 27 and its ends portion 27b. As shown, the diameter of the bore 26 is appreciably larger than the diameter of the portion of the valve member 27 received therein.

Threaded in the casing 19 and above the diaphragm 20 and valve member 27 is a bias spring adjustment screw 29 provided with an annular recess 30 to receive and position the bias spring 31. A disc 32 is affixed to the diaphragm 20 annularly about the valve member 27 to provide a rigid surface to abut against the bias spring 31 and fix the effective area of diaphragm 20. An exhaust adjustment screw 33 is concentrically threaded in the spring adjustment screw 29 directly above the ball valve 34. The ball valve 34 is free to travel in the vertical direction between the valve seat 27a and the lower end of the exhaust adjustment screw 33. An annular member 35 is disposed in the outlet chamber 25 in alignment directly below the valve member 27. The member 35 is provided with a bore 36 which is coaxial with a bore 28 in the valve member 27 and which serves as a valve seat for the spherical end portion 27b. The bore 36 communicates directly with an outlet port 37.

As depicted in FIGURE 1, the supply line pressure of 15 p.s.i. applied to the diaphragm 20 of the switching valve 11 is insufficient to overcome the bias of the spring 31 with the result that the spherical end portion 27b of the valve member 27 is forced into seating engagement with the bore 36 by the spring 31. Hence, communication between the inlet chamber 23 and the outlet port 37 through the bore 36 is blocked. However, communication is established between the exhaust chamber 21 and the outlet port 37 so that any pressure appearing at the outlet port 37 unseats the ball valve 34 and exhausts to atmosphere. In brief, the switching valve 11 may be characterized as responding to the 15 p.s.i. supply line pressure by providing at its outlet port 37 a first switching signal in the form of an exhaust or vent pressure condition.

As depicted in FIGURE 3, the supply line pressure of 22 p.s.i. applied to the diaphragm 20 is sufficient to overcome the bias of the spring 31, forcing the valve member 27 upwardly such that the ball valve 34 is forced into seating engagement with the valve seat 27a by the lower end of the exhaust adjustment screw 33. Accordingly, communication is established between the inlet chamber 23 and the outlet port 37 through the bore 26, and communication between the outlet port 37 and the exhaust chamber 21 through the bore 28 in the valve member is blocked. Hence, the switching valve 11 may be characterized as responding to the 22 p.s.i. supply line pressure by providing at its outlet port 37 a second switching signal in the form of supply line pressure.

The override selector

The override selector 18 comprises a casing 38 provided with an elongate bore 39 adapted to receive a bias-spring 40 and a selector rod 41 provided with a notch portion 52 intermediate its ends. An annular flange 41a disposed in an enlarged portion 39a of the bore 39, limits the range of longitudinal travel of the rod 41. Located transversely of the bore 39 is a recess 42 adapted to accommodate a latch member 43 which completely encircles the rod 41. The bore 39 communicates through the recess 42 with a pressure chamber 44 provided with an inlet port 50. The pressure chamber 44 is separated by a motor diaphragm 45 from a second chamber 46 which communicates directly with the atmosphere through a bore 47. The base of the latch member 43 is mounted centrally in the diaphragm 45 with a disc 48 encircling it to fix the effective area of diaphragm 45 and to provide a rigid surface to abut against a latch spring 49 disposed in the chamber 46. The latch spring 49 urges the latch member 43 into a disengaged position relative to the selector rod 41.

The override selector 18 is further provided with an outlet port 51 communicating with the bore 39. As illustrated in FIGURES 1 and 3, the diameter of the selector rod 41 is sufficiently smaller than the diameter of the bore 39 to permit communication between the pressure chamber 44 and the outlet port 51 via the bore 39 when the override selector is in the non-actuated position shown.

As depicted in FIGURE 4, when the selector rod 41 is pressed inwardly against the force of the bias spring 40 and turned, the notched portion 52 is engaged by the latch 43 if supply pressure is present in the inlet chamber 44. With the latch member 43 engaged in the notched portion 52, an O-ring 53 engaged in an annular recess in the selector rod 41 blocks the communication through the bore 39 between the inlet chamber 44 and the outlet port 51 while simultaneously exhausting to atmosphere through the open end 54 of the bore 39 any pressure appearing at the outlet port 51.

*The change-over valve*

The change-over valve 14 comprises a casing 55 which defines a motor chamber 56 having an inlet port 57 and separated by a motor diaphragm 58 from a second chamber 59 which communicates directly with atmosphere through a bore 60. An elongate valve stem 61 is centrally mounted at one end in the motor diaphragm 58 and is received within a bore 62 extending from the inlet chamber 56. A disc 63 encircling the end of the valve stem 61 is mounted on the motor diaphragm 58 so as to fix the effective area of diaphragm 58 and to provide a rigid surface to abut against a bias spring 64 in the chamber 59 which urges the valve stem 61 inwardly in the bore 62.

At an intermediate point along the bore 62 is a first control mode chamber 65 which is adapted to communicate through the bore 62 with a valving chamber 66. An O-ring 67 engaged in an annular recess in the valve stem 61 prevents communication between the inlet chamber 56 and the first control mode chamber 65. The valving chamber 66 also communicates through the bore 62 with a second control mode chamber 68 located at opposite ends of the bore 62 from the inlet chamber 56. A valve member 69 fabricated of rubber, neoprene, or the like, is disposed in the valving chamber 66 and engaged about a second annular recess in the valve stem 61.

The first control mode chamber 65 communicates with the valve port 71 of the temperature-responsive bleed valve 12. Similarly, the second control mode chamber 68 communicates with the valve port 73 of the temperature-responsive bleed valve 13. It will be noted that the bias spring 64 normally urges the valve member 69 into a position blocking communication between the second control mode chamber 68 and the valving chamber 66. This position of the valve member 69 also opens communication between the first control chamber 65 and the valving chamber 66. However, when supply pressure appears at the inlet port 57 of the motor chamber 56, the force of the bias spring 64 is covercome and the motor diaphragm 58 moves the valve stem 61 so as to position the valve member 69 to now block communication between the valving chamber 66 and the first control mode chamber 65 and opens communication between the second control mode chamber 68 and the valving chamber 66.

The first temperature responsive bleed valve 12 comprises a casing 70 defining the valve port 71, a spherical valve member 74 provided with a positioning pin 75, and a temperature sensing bimetal 76. The valve member 74 is adapted to cooperate with the port 71 to vary the amount of flow through the port 71 in accordance with the temperature-derived force exerted on the valve member 74 by the bimetal 76.

Similarly, the second temperature responsive bleed valve 13 comprises a casing 72 defining the valve port 73, a spherical valve member 77 provided with a positioning pin 78, and a temperature sensing bimetal 79. The valve member 77 is adapted to cooperate with the port 73 to vary the amount of flow through the port 73 in accordance with the temperature-derived force exerted on the valve member 77 by the bimetal 79.

The bimetallic elements 76 and 79 are shown somewhat diagrammatically and may be of conventional design. It is preferable, however, to utilize a bimetallic element in which the force generated by each bimetallic element per unit tempearture and exerted on its associated valve member 74 or 77 may be readily varied in order to adjust it to correspond to the characteristics of the particular installation. A bimetallic element of this type is described in Norman et al. Patent No. 3,183,719, issued May 18, 1965.

*The relay*

The relay 16 is preferably a force-balance relay similar to the type described in detail in Taylor Patent No. 3,244,190, issued April 5, 1966. It comprises a casing 80 which includes a modulating pressure chamber 81 having an inlet port 82 and separated by a diaphragm 83 from a control pressure chamber 84 having an outlet port 85. An annular member 86 is mounted centrally in the diaphragm 83 and provided with a port 87 extending therethrough. The casing 80 further defines a supply pressure chamber 88 which is provided with an inlet port 89. Communication is enabled between the supply pressure chamber 88 and the control pressure chamber 84 by means of a port 90. In the port 90 is disposed a valve member 91 having a first spherical end portion 92 adapted to valve the port 87 between the modulating pressure chamber 81 and the control pressure chamber 84. At its opposite end, the valve member 91 is provided with a second spherical end portion 93 disposed in the supply pressure chamber 88 to valve the port 90 between the supply pressure chamber 88 and the control pressure chamber 84. A first bias spring 94 is mounted in the modulating pressure chamber 81 so as to urge the diaphragm 83 and the member 86 downwardly and against the spherical end 92 of the valve member 91. A second bias spring 95 is mounted in the supply pressure chamber 88 in engagement with the spherical end 93 of the valve member 91, serving to bias the valve member 91 upwardly such that the spherical end 93 is urged toward a position closing the port 90. The upper bias spring 94 is designed to exert a slightly greater expansion force than the lower bias spring 95. Hence, a residual or equilibrium pressure level sufficient to balance the opposed spring forces is maintained in the control pressure chamber 84.

Upon the appearance at the modulating pressure chamber inlet port 82 of a pressure decrease indicative of a deviation from the desired ambient temperature level, the spherical end 92 of the valve member 91 is unseated from the port 87 and the end 93 is seated in the port 90 as a result of upward movement of the diaphragm 83. This causes the pressure in the control pressure chamber 84 to decrease by exhausting through the inlet port 82 until a condition of balance is again sensed by the diaphragm 83.

It should be noted that by allowing the control pressure chamber to exhaust through the inlet port 82, a negative feed back pressure signal is applied to the bimetal of the temperature-responsive bleed valve, indicating that a temperature-correction signal has been emitted to the conditioning equipment by the relay 16 and tending to allow the bimetal to return to normal position.

A subsequent increase in the pressure in the modulating pressure chamber 81 indicating correction of the temperature deviation produces a downard movement of the diaphragm 83, unseating the spherical end 93 of the valve member 91 in the port 90 and allowing the pressure level in the control pressure chamber 84 to increase until the diaphragm 83 again senses a condition of balance in the relay 16. In this manner the relay 16 effectively amplifies the modulating pressure signals appearing at its inlet 82 to obtain a control pressure signal at its outlet port 85. It should be understood, however, that the structure of the relay 16 is not a limiting factor in this invention. Other types of relays known in the art might also be used.

Occupancy-nonoccupancy temperature control

Referring specifically now to FIGURE 1, the supply pressure input from the central station pressure source has been set at 15 p.s.i. to put into effect the occupancy temperature control mode throughout the building in order to maintain the various rooms and other building areas at some desired temperature level, normally 72°. At the individual room thermostats, this level of pressure is insufficient to overcome the force of the bias spring 31 in the switching valve 11. Accordingly, communication of supply line pressure through the switching valve is blocked and the motor chamber 56 of changeover valve 14 is exhausted via the path comprising the conduit 99, the override selector 18, the conduit 98, and switching valve exhaust chamber 21. Hence, the bias spring 64 in the change-over valve 14 maintains the valve stem 61 in an inward position in the bore 62 such that the valve member 69 opens communication between the first control mode chamber 65 and the valving chamber 66 while blocking communication between the valving chamber 66 and the second control mode chamber 68. The temperature responsive bleed valve 12 is accordingly activated to accomplish the desired occupancy mode temperature control.

The occupancy mode bimetal 76 is direct acting. It responds to a downward deviation in ambient temperature from the desired temperature level of 72° by deflecting away from the valve member 74, thereby allowing an increase in flow of pneumatic fluid out of the nozzle 70 in the well-known manner of a flapper valve. As shown in FIGURE 1, the pneumatic fluid is furnished to the first control mode chamber 65 and the bleed valve 12 from the supply line 10 through conduit 96, restriction 15, and conduit 97. Hence, the response of the bleed valve 12 to an ambient temperature deviation below the 72° level produces a pressure drop across the restriction 15 which serves as a modulating pressure signal communicated to the relay 16 by the conduit 97. In the relay 16 a corresponding pressure decrease occurs in the control pressure chamber 84 in the manner previously described and is communicated to the heating equipment motor valve (not shown) via the control pressure conduit 17. The heating equipment motor valve reacts in the conventional manner to provide an increase in heating in the room in order to return the ambient temperature level to the desired 72° as determined by the bimetal 76. In this manner, the room temperature is maintained at the 72° occupancy mode temperature setting.

At some predetermined time in the evening, the two-mode temperature control system throughout the building is changed over to the non-occupancy temperature control mode to maintain a lower temperature level, for example 60°. The change-over is initiated from a central control station by raising the supply pressure to 22 p.s.i. by means of a timing device or simply by building maintenance personnel. At the room thermostats, as illustrated in FIGURE 3, the 22 p.s.i. pressure level in the supply line 10 is sufficient to move the diaphragm 20 upwardly against the force of the spring 31. The spherical end portion 27a of the valve member 27 is thereby seated in the valve seat 34 preventing communication between the outlet port 37 and the exhaust chamber 21 and opening communication between the inlet chamber 22 and the outlet port 37 via the bore 26 and the bore 36. Hence, the pneumatic fluid at the pressure level of 22 p.s.i. is introduced into the conduit 98 and permitted to flow through the override selector 18 via the path of inlet port 50, bore 39 and outlet port 51. From the selector 18, the 22 p.s.i. pressure is communicated to the motor chamber 56 of the change-over valve 14 via the conduit 99 and the inlet port 57. Here, the 22 p.s.i. supply pressure moves the motor diaphragm 58 against the force of the spring 64, thereby positioning the valve stem 61 in the bore 62 so that the valve member 69 blocks communication between the valving chamber 66 and the first control mode chamber 65. Communication is thus opened between the valving chamber 66 and the second control mode chamber 68. Accordingly, control of the ambient temperature is transferred to the second temperature responsive bleed valve 13. Like the bimetal 76, the bimetal 79 of bleed valve 13 is direct acting. Hence, pressure signals indicative of temperature deviations downwardly from the desired temperature level of 60° are developed across the restriction 15, amplified in the relay 16, and transmitted to the heating equipment motor valve via the branch line 17. Thus, the ambient room temperature is continuously maintained at the non-occupancy temperature control mode setting of 60°.

When the system is again returned to occupancy mode temperature control at the central control station by lowering the supply pressure to 15 p.s.i., the spherical end portion 27b of the valve member 27 in the switching valve 11 is forced to seat in the valve seat 35 by the bias spring 31, allowing the motor chamber 56 of the change-over valve 14 to again exhaust. The bias spring 64 in the change-over valve 14, in turn, effects change-over to the occupancy temperature control mode.

Also, with the system throughout the building set for nonoccupancy temperature control, personnel working in the building during the periods of normal nonoccupancy may provide local occupancy temperature mode control at the level of 72° in the room or area in which they are working merely by pushing in the rod 41 of the override selector 18 and twisting it until, as illustrated in FIGURE 4, the latch member 43 is engaged in the notch 52. The 22 p.s.i. pressure exerted on the motor diaphragm 45 maintains the latch member 43 in engagement against the force of the latch spring 49. The O-ring 53 prevents communication between the inlet port 50 and the outlet port 51 and allows the motor chamber 56 of the change-over valve 14 to exhaust to atmosphere through the open-end 54 of the bore 39. Accordingly, in the valve 12 the valve stem 61 is moved against inwardly in the bore 62 by the bias spring 64 so that the valve member 69 blocks communication between the valving chamber 66 and the second control mode chamber 68 and opens communication between the valving chamber 66 and the first control mode chamber 65. Hence, the room or building area in which the thermostat is located will now be maintained at the occupancy temperature level setting of 72°.

If the override selector is not manually returned to the disengaged position by twisting the selector rod 41 until the latch 43 disengages from the notch 52, it will be automatically returned to disengaged condition when the temperature control system is again switched to occupancy temperature control from the central control station. Specifically, when the supply pressure is again returned to 15 p.s.i., and the switching valve reverts to vent condition, the pressure chamber 44 in the override selector 18 is exhausted into the exhaust chamber 21 of the switching valve 11 and the latch spring 49 disengages the latch 43 from the notch 52, returning the override selector 18 to nonactuated condition.

Heating-cooling temperature control

The embodiment illustrated in FIGURES 1 and 3 may also be readily adapted for selective heating or cooling temperature control. For this type of temperature control, a cooling control, reverse acting bimetal 76 is provided in the first control mode bleed valve 12 in order to produce pressure signals to the relay 16 indicative of temperature deviations above the desired room temperature level, normally 72°. The bimetal 79 in the second control mode bleed valve 13 remains a heating control direct acting type.

The heating control bleed valve 13 is activated and the cooling control bleed valve 12 deactivated when the pressure level in the supply line 10 is raised to 22 p.s.i. at the central control station.

When the pressure in the supply line 10 is lowered to 15 p.s.i., the heating control bleed valve 13 is deactivated and the cooling control bleed valve 12 is activated. It is understood, of course, that the switching of the room thermostats from heating to cooling accompanies a change-over in the building conditioning system from heating to cooling so that the equipment motor valve controlled by the output from the room thermostat effectively regulates cooling equipment in lieu of heating equipment.

The override selector 18 is not utilized on a day-to-day basis in the heating-cooling control room thermostat and could be dispensed with without impairing the heating-cooling two-mode control. However, it does provide a unique installation and maintenance feature which facilitates ease of set point adjustment by enabling the thermostat to be readily switched from the one bleed valve to the other while the supply line pressure remains at 22 p.s.i. Accordingly, in the heating-cooling thermostat, the L-shaped portion of the selector rod 41 is preferably deleted and a recessed, slotted end provided for the rod 41 as depicted in FIGURE 5 in order to minimize the possibility of inadvertent actuation by persons other than installation or maintenance personnel.

Additional considerations

From the foregoing description, it should be apparent that a further salient feature of this invention is the fact that the latch bias spring 49 in the override selector 18, and the bias spring 64 in the change-over valve 14 need not be adapted to be overcome by their associated motor diaphragms 45 and 58 at a precise pressure level since the switching valve 11 is effective to subject the motor diaphragms 45 and 58 to only two primary pressure conditions or switching signals, i.e., supply pressure and atmospheric pressure. Hence, it is not necessary that the motor diaphragms 45 and 58 be adapted to sense a difference between 15 p.s.i. and 22 p.s.i. pressure since this pressure sensing function is provided by switching valve 11. The switching valve 11 may be finely set or calibrated to meet the requirements of a particular installation by adjustment of the bias spring adjustment screw 29 and the exhaust adjustment screw 33. This feature enhances the versatility of the thermostat and facilitates installation and maintenance.

As previously indicated, the structure of the relay 16 is not a limiting factor in this invention and other forms of relays might be utilized. For example, it may be found desirable to provide a built-in restriction in the relay 16 between the control pressure chamber 84 and the modulating pressure chamber 81 thereby eliminating the need for the restriction 15. This form of relay construction is specifically described in the copending application of Wesley F. Taylor previously referred to above. Where the amplification and rapid response produced by a relay are not required, it is possible to dispense with the relay 16 in which case the pressure signals would be transmitted directly from the conduit 97 to the motor valve.

Although certain specific embodiments and terminology have been described and used throughout the specification, it is to be understood that this is merely by way of example and in no manner to be considered as a limitation. It is apparent that certain modifications may be made within the scope of the claims without departing from the spirit of the invention.

What is claimed is:

1. A pneumatic temperature control device comprising: a source for supplying pneumatic fluid at a first predetermined pressure to initiate a first temperature control mode and at a second predetermined pressure to initiate a second temperature control mode; means for communicating control pressure signals from said temperature control device; first temperature responsive means adapted when activated to effect a control pressure signal which is a function of ambient temperature and indicative of said first temperature control mode; second temperature responsive means adapted when activated to effect a control pressure signal which is a function of ambient temperature and indicative of said second temperature control mode; a change-over valve provided with motor means, said change-over valve being adapted to selectively activate said first temperature responsive means when said motor means are not subject to supply pressure, said change-over means being further adapted to selectively activate said second temperature responsive means when said motor means are subject to supply pressure and pressure sensitive switching means connected to said source, said switching means comprising a casing including an inlet port connected to said source, an outlet port connected with motor chamber of said changeover valve motor means, and an exhaust port, a diaphragm mounted in said casing, a valve member mounted in said diaphragm, and means biasing said valve member into a first position permitting communication between said outlet port and said exhaust port and blocking communication between said inlet port and said outlet port, said diaphragm being responsive to the presence of said second predetermined pressure in said inlet port to overcome said biasing means and move said valve member into a second position permitting communication between said inlet port and said outlet port and blocking communication between said outlet port and said exhaust port, said switching means thereby being responsive to said second predetermined supply pressure to communicate the same to said change-over valve motor means and responsive to said first predetermined supply pressure to vent said change-over valve motor means.

2. A pneumatic temperature control device comprising: a source for supplying pneumatic fluid at a first predetermined pressure to initiate a first temperature control mode and at a second predetermined pressure to initiate a second temperature control mode; means for communicating pressure signals from said temperature control device; a first temperature responsive valve adapted when activated to effect a control pressure signal which is a function of ambient temperature and indicative of said first temperature control mode; a second temperature responsive valve adapted when activated to effect a control pressure signal which is a function of temperature and indicative of said second temperature control mode; a change-over valve provided with motor means, said change-over valve being adapted to selectively activate said first temperature responsive valve when said motor means are not subject to supply line pressure, said change-over valve being further adapted to selectively activate said second temperature responsive valve when said motor means are subject to supply pressure; pressure sensitive switching means connected to said source; and override means connecting said pressure sensitive switching means and said change-over valve motor means and adapted to provide communication therebetween when not actuated, said switching means being responsive to said second predetermined supply pressure to communicate the same to said change-over valve motor means through said override means and responsive to said first predetermined supply pressure to vent said override means and said change-over valve motor means, said override means being adapted to be externally actuated to block communication of supply pressure to said change-over valve motor means and simultaneously vent said motor means, said override means being further adapted to return to non-actuated condition when vented by said switching means, said override means comprising a casing providing a bore venting at one end, an inlet port, a pressure chamber providing communication between said inlet port and said bore and an outlet port communicating with said bore, a selector rod disposed in said bore and limited in longitudinal travel therein, said selector rod having a notch portion, a latch member adapted to engage said notch portion, a latch diaphragm affixed to said latch member, first spring means biasing said selector rod into a non-actuated position blocking communication of said inlet and outlet ports with said venting end of said bore and enabling communication between said inlet and outlet ports, second spring means disposed and biasing said latch diaphragm and latch member into a position preventing engagement of said latch member in said notch portion of said selector rod, said latch diaphragm being responsive to the presence of supply pressure in said pressure chamber to condition said latch member to engage said notch portion of said selector rod when said notch portion is aligned with said latch member by the application of external actuating force to said selector rod, said selector rod being adapted when said notch portion is engaged by said latch member to block communication between said inlet port and said outlet port and to enable communication between said outlet port and said venting end of said bore.

3. A pneumatic temperature control device comprising: a source of supplying pneumatic fluid under pressure; a pair of temperature responsive valves; change-over means adapted when subject to supply pressure to selectively activate one of said pair of temperature responsive valves and adapted when not subject to supply pressure to selectively activate the other one of said pair of temperature responsive valves; and a pressure sensitive switching valve having an exhaust chamber provided with an exhaust port, an inlet chamber provided with an inlet port connected to said source, an outlet port communicating with said change-over means, a diaphragm separating said exhaust chamber from said inlet chamber, a valve member mounted in said diaphragm and provided with a bore adapted to enable communication between said exhaust chamber and said outlet port, and spring means biasing said valve member into a first valving position blocking communication between said inlet chamber and said outlet port and providing communication between said exhaust chamber and said outlet port, said diaphragm being responsive to a predetermined supply pressure to move said valve member against the force of said spring means into a second valving position blocking communication between said outlet port and said exhaust chamber and providing communication between said inlet chamber and said outlet port.

4. A pneumatic temperature control device comprising: a source for supplying pneumatic fluid under pressure; a pair of temperature responsive valves; a change-over valve having motor means, said change-over valve being adapted to selectively activate one of said pair of temperature responsive valves when said motor means are not subject to supply pressure, said change-over valve being further adapted to selectively activate the other one of said pair of temperature responsive valves when said motor means are subject to supply pressure; pressure sensitive switching means normally venting said change-over valve motor means but responsive to the presence of a predetermined supply pressure to communicate the same to said change-over valve motor means; and an override selector connected between said change-over valve motor means and said pressure sensitive switching means, said override means including a bore venting at one end, an inlet port connected to said switching means and communicating with said bore, an outlet port connected to said change-over valve motor means and communicating with said bore, a pressure chamber providing communication between said inlet port and said bore, a selector rod disposed in said bore and limited in longitudinal travel therein, said selector rod having a notch portion, a latch member adapted to engage said notch portion, a latch diaphragm affixed to said latch member, first spring means biasing said selector rod into a non-actuated position blocking communication of said inlet and outlet ports with said venting end of said bore and opening communication between said inlet and outlet ports, second spring means biasing said latch diaphragm into a position preventing engagement of said latch member in said notch portion of said selector rod, said latch diaphragm being responsive to the presence of supply pressure in said pressure chamber to condition said latch member to engage said notch portion when said notch portion is aligned with said latch member by the application of external actuating force to said selector rod, said selector rod being adapted when said notch portion is engaged by said latch member to block communication between said inlet port and said outlet port and to open communication between said outlet port and said venting end of said bore.

5. In a pneumatic thermostat a pressure sensing switching valve comprising: a casing including an exhaust chamber having an exhaust port, an inlet chamber having an inlet port for supply pressure, and an outlet port; a diaphragm separating said exhaust chamber from said inlet chamber; a valve member mounted in said diaphragm and having a bore adapted to provide communication between said exhaust chamber and said outlet port; spring means biasing said valve member into a first valving position blocking communication between said inlet chamber and said outlet port and opening communications between said exhaust chamber and said outlet port; and means for varying the force exerted on said valve member by said spring means, said diaphragm being responsive to a predetermined pressure level in said inlet chamber to move said valve member against the force of said spring into a second valving position opening communication between said inlet chamber and said outlet port and blocking communication between said outlet port and said exhaust chamber.

6. In a two mode pneumatic thermostat having a pair of temperature responsive means each of which is associated with a particular temperature control mode and having change-over means adapted to selectively activate one or the other of said temperature responsive means in dependence upon a presence or absence of supply pressure communicated to said change-over means from switching means connected to source of supply pressure, override means connected between the switching means and the change-over means comprising: a casing providing a bore venting at one end a pressure chamber communicating with said bore and provided with an inlet port and an outlet port communicating with said bore; a selector rod disposed in said casing and limited in longitudinal travel therein, said selector rod having a notch portion; an annular sealing member mounted on said selector rod; a latch member adapted to engage said notch portion; a latch diaphragm affixed to said latch member; a first spring biasing said selector rod into a non-actuated position in which said sealing member blocks communication of said inlet and outlet ports with said venting end of said bore and enables communication between said inlet port and said outlet port; a second spring biasing said latch member into a position preventing engagement of said latch member in said selector rod notch portion; said latch diaphragm being responsive to the presence of supply pressure in said pressure chamber to condition said latch member to engage said selector rod notch portion when said notch portion is aligned with said latch member by the application of an external actuating force on said selector rod, said sealing member being adapted when said selector rod notch portion is engaged by said latch member to block communication between said inlet port and said outlet port and to enable communication between said outlet port and said venting end of said bore.

7. A pneumatic temperature control device comprising: a source for supplying pneumatic fluid at a first predetermined pressure to initiate a first temperature control mode and at a second predetermined pressure to initiate a second temperature control mode; means for communicating control pressure signals from said temperature control device; a first temperature responsive bleed valve adapted when activated to effect a control pressure signal which is a function of ambient temperature and indicative of said first temperature control mode; a second temperature responsive bleed valve adapted when activated to effect a control pressure signal which is a function of ambient temperature and indicative of said second temperature control mode; a pressure sensitive switching valve connected to said source and operative in response to said first predetermined supply pressure to provide a first switching condition and operative in response to said second predetermined supply pressure to provide a second switching condition, said first switching condition comprising providing an exhaust path for said changeover means and said second switching condition comprising communicating supply pressure to said changeover means; and changeover means responsive to said first switching condition to activate said first temperature responsive valve and deactivate said second temperature responsive valve, said changeover means being responsive to said second switching condition to activate said second temperature responsive bleed valve and deactivate said first temperature responsive bleed valve; a casing including a first pressure chamber communicating with one of said pair of temperature responsive bleed valves, a second pressure chamber communicating with the other one of said pair of temperature responsive bleed valves, a valving chamber disposed between said first and second pressure chambers and provided with a supply port, a first valving port adapted to provide communication between said valving chamber and said first pressure chamber, a second valving port adapted to provide communication between said valving chamber and said second pressure chamber, said first and second valving ports being substantially equal in size and coaxially disposed on opposite sides of said valving chamber, a motor chamber having an inlet port communicating with said switching valve, and a bore extending between said first pressure chamber and said motor chamber in coaxial alignment with said first and second valving ports, a valve stem slidably disposed in said bore and extending through said first pressure chamber and said valving chamber into said second pressure chamber, a valve member mounted on said valve stem and movable in its entirety with respect to said casing, said valve member being disposed within said valving chamber such that said valve member is upstream of said first and second valving ports, sealing means disposed in said bore for preventing pressure communication through said bore, a spring biasing said valve stem toward a first valving position wherein said valve member opens said first valving port and closes said second valving port, and a motor diaphragm forming a wall portion of said motor chamber and connected to said valve stem, said motor diaphragm being responsive to the presence of supply pressure in said motor chamber to overcome said bias spring and move said valve stem to a second valving position wherein said valve member closes said first valving port and opens said second valving port.

8. A temperature control device as defined in claim 7 wherein said switching valve includes: an exhaust chamber having an exhaust port; an inlet chamber having an inlet port for supply pressure; an outlet port to communicate with said change-over means; a diaphragm separating said exhaust chamber from said inlet chamber; a valve member mounted in said diaphragm and having a bore adapted to provide communication between said exhaust chamber and said outlet port; and spring means biasing said valve member into a first valving position blocking communication between said inlet chamber and said outlet port and opening communication between said exhaust chamber and said outlet port, said diaphragm being responsive to a predetermined pressure level in said inlet port to move said valve member against the force of said spring means into a second valving position opening communication between said inlet chamber and said outlet port and blocking communication between said outlet port and said exhaust chamber.

9. A pneumatic temperature control device comprising: a source for supplying pneumatic fluid under pressure; a pair of temperature responsive bleed valves; changeover means; and pressure sensitive switching means connected to said source, said changeover means comprising: a casing including a first pressure chamber communicating with one of said pair of temperature responsive bleed valves, a second pressure chamber communicating with the other one of said pair of temperature responsive bleed valves, a valving chamber disposed between said first and second pressure chambers and provided with a supply port, a first valving port adapted to provide communication between said valving chamber and said first pressure chamber, a second valving chamber adapted to provide communication between said valving chamber and said second pressure chamber, said first and second valving ports being substantially equal in size and coaxially disposed on opposite sides of said valving chamber, a motor chamber having an inlet port communicating with said switching means, and a bore extending between said first pressure chamber and said motor chamber in coaxial alignment with said first and second valving ports, a valve stem slidably disposed in said bore and extending through said first pressure chamber and said valving chamber into said second pressure chamber, a valve member mounted on said valve stem and movable in its entirety with respect to said casing, said valve members being disposed within said valving chamber such that said valve member is upstream of said first and second valving ports; sealing means disposed in said bore for preventing pressure communication through said bore, a spring biasing said valve stem toward a first valving position wherein said valve member opens said first valving port and closes said second valving port, and a motor diaphragm forming a wall portion of said motor chamber and connected to said valve stem, said motor diaphragm being responsive to the presence of supply pressure in said motor chamber to overcome said bias spring and move said valve stem to a second valving position wherein said valve member closes said first valving port and opens said second valving port; switching means normally venting said changeover means motor chamber but responsive to a pre-determined supply pressure to communicate the same to said changeover means motor chamber.

10. In a pneumatic thermostat having a pair of temperatures responsive bleed valves, changeover means for selectively activating one or the other of said temperature responsive means comprising: a casing including a first pressure chamber communicating with one of said pair of temperature responsive bleed valves, a second pressure chamber communicating with the other one of said pair of temperatures responsive bleed valves, a valving chamber disposed between said first and second pressure chambers and provided with a supply port, a first valving port adapted to provide communication between said valving chamber and said first pressure chamber, a second valving port adapted to provide communication between said valving chamber and said second pressure chamber, said first and second valving ports being substantially equal in size and co-axially disposed on opposite sides of said valving chamber, a motor chamber having an inlet port, and a bore extending between said first pressure chamber and said motor chamber in coaxial alignment with said first and second valving ports; a valve stem slidably disposed in said bore and extending through said first pressure chamber and said valving chamber into said second pressure chamber; a valve member mounted on said valve stem and movable in its entirety with respect to said casing, said valve member being disposed within said valving chamber such that said valve member is upstream of said first and second valving ports; sealing means disposed in said bore for preventing pressure communication through said bore; a spring biasing said valve stem toward a first valving position wherein said valve member opens said first valving port and closes said second valving port; and a motor diaphragm forming a wall portion of said motor chamber and connected to said valve stem, said motor diaphragm being responsive to the presence of supply pressure in said motor chamber to overcome said bias spring and move said valve stem to a second valving position wherein said valve member closes said first valving port and opens said second valving port.

References Cited by the Examiner

UNITED STATES PATENTS

| | | | |
|---|---|---|---|
| 2,193,295 | 3/1940 | Otto | 236—47 |
| 2,727,691 | 12/1955 | Alyea, et al. | 236—38 |
| 3,047,233 | 7/1962 | Scharpf | 236—1 |
| 3,140,047 | 7/1964 | Holloway | 236—1 |
| 3,212,710 | 10/1965 | Nilles | 236—47 |

EDWARD J. MICHAEL, *Primary Examiner.*